(12) United States Patent
Ottikkutti et al.

(10) Patent No.: US 11,371,464 B2
(45) Date of Patent: Jun. 28, 2022

(54) METHODS AND SYSTEM FOR DIAGNOSING FUEL INJECTORS OF AN ENGINE

(71) Applicant: Transportation IP Holdings, LLC, Norwalk, CT (US)

(72) Inventors: Pradheepram Ottikkutti, Erie, PA (US); Shailesh Nair, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 53 days.

(21) Appl. No.: 17/092,180

(22) Filed: Nov. 6, 2020

(65) Prior Publication Data

US 2021/0054804 A1    Feb. 25, 2021

Related U.S. Application Data

(62) Division of application No. 16/447,895, filed on Jun. 20, 2019, now abandoned, which is a division of application No. 15/248,715, filed on Aug. 26, 2016, now Pat. No. 10,344,704.

(51) Int. Cl.
*F02D 41/40*  (2006.01)
*F02D 41/22*  (2006.01)
*F02D 35/02*  (2006.01)

(52) U.S. Cl.
CPC ........ *F02D 41/403* (2013.01); *F02D 41/221* (2013.01); *F02D 35/027* (2013.01); *F02D 41/402* (2013.01); *F02D 2041/224* (2013.01); *F02D 2200/101* (2013.01); *F02D 2200/1002* (2013.01); *F02D 2200/1012* (2013.01); *F02D 2200/602* (2013.01); *Y02T 10/40* (2013.01)

(58) Field of Classification Search
CPC .... F02D 41/402; F02D 41/403; F02D 41/221; F02D 2041/224; F02D 2200/025; F02D 2200/06; F02D 2200/1002; F02D 2200/101

See application file for complete search history.

(56) References Cited

U.S. PATENT DOCUMENTS

| 5,402,760 A * | 4/1995 | Takeuchi | F02D 41/3836 123/490 |
| 7,552,709 B2 * | 6/2009 | Fujii | F02D 41/247 123/472 |
| 8,340,887 B2 * | 12/2012 | Yamaguchi | F02D 41/403 123/480 |

(Continued)

*Primary Examiner* — Gonzalo Laguarda
(74) *Attorney, Agent, or Firm* — McCoy Russell LLP

(57) ABSTRACT

Various methods and systems are provided for diagnosing a condition of a fuel injector of an engine. In one example, a method for an engine includes injecting a first pulse of fuel as a first pilot injection into a first subset of cylinders of a plurality of engine cylinders, where the first pilot injection precedes a primary injection of fuel into the first subset of cylinders by a duration; correlating a first response in an engine operating parameter to the first pilot injection; and adjusting the primary injection of fuel into the first subset of cylinders based on the first response. In one example, the first pilot injection precedes the primary injection by a predefined short duration and the primary injection of fuel is adjusted within a predefined or preset upper limit and lower limit.

10 Claims, 7 Drawing Sheets

(56) References Cited

U.S. PATENT DOCUMENTS

| | | | | |
|---|---|---|---|---|
| 8,904,997 B2* | 12/2014 | Watanabe | ............ | F02D 41/405 |
| | | | | 123/299 |
| 9,371,076 B2* | 6/2016 | Woo | ........................ | B61L 3/127 |
| 9,599,062 B2* | 3/2017 | Van Nieuwstadt | ... | F02D 41/403 |
| 2015/0300286 A1* | 10/2015 | Ikemoto | ................. | F02D 41/22 |
| | | | | 73/114.48 |
| 2016/0010576 A1* | 1/2016 | Primus | ................ | F02D 41/0052 |
| | | | | 701/104 |
| 2016/0025031 A1* | 1/2016 | Van Nieuwstadt | ... | F02D 41/403 |
| | | | | 701/104 |
| 2016/0138486 A1* | 5/2016 | Lee | ...................... | F02D 41/024 |
| | | | | 701/104 |
| 2017/0107924 A1* | 4/2017 | Blythe | ................ | F02D 41/0065 |
| 2017/0241350 A1* | 8/2017 | Ebbehoj | ............... | F02D 19/022 |

* cited by examiner

METHODS AND SYSTEM FOR DIAGNOSING FUEL INJECTORS OF AN ENGINE

CROSS-REFERENCE TO RELATED APPLICATIONS

The present application is a divisional of U.S. patent application Ser. No. 16/447,895 entitled "METHODS AND SYSTEM FOR DIAGNOSING FUEL INJECTORS OF AN ENGINE", and filed on Jun. 20, 2019. U.S. patent application Ser. No. 16/447,895 is a divisional of U.S. patent application Ser. No. 15/248,715 entitled "METHODS AND SYSTEM FOR DIAGNOSING FUEL INJECTORS OF AN ENGINE", and filed on Aug. 26, 2016. The entire contents of the above-identified applications are hereby incorporated by reference for all purposes.

BACKGROUND

Technical Field

Embodiments of the subject matter disclosed herein relate to an engine system including fuel injectors and diagnosing a condition of the fuel injectors based on a response in an engine operating parameter (following injecting fuel with the fuel injectors).

Discussion of Art

An engine, such as a diesel engine, may include a fuel system including a plurality of fuel injectors. In one example, one fuel injector may be coupled to each cylinder of the multi-cylinder engine. Each fuel injector may be adapted to inject a pulse of fuel into the cylinder at a different time in an engine cycle, according to a cylinder firing order of the engine. A controller of the engine may assume a uniform injector health over the life of the injector and may not distinguish between newer and older injectors. As such, fuel injection parameters of the engine may remain the same throughout a lifetime of use of the injector. However, over time, one or more of the injectors may age or become degraded (e.g., faulty) which may cause the one or more injectors to inject more or less fuel than expected (or commanded). As a result, engine emissions may increase and performance of the engine may decrease.

BRIEF DESCRIPTION

In one embodiment, a method for an engine (e.g., a method for controlling an engine system) comprises injecting a first pulse of fuel as a first pilot injection into a first subset of cylinders of a plurality of engine cylinders, where the first pilot injection precedes a primary injection of fuel into the first subset of cylinders by a duration; correlating a first response in an engine operating parameter to the first pilot injection; and adjusting the primary injection of fuel into the first subset of cylinders based on the first response.

DETAILED DESCRIPTION

The following description relates to embodiments of diagnosing a condition of one or more fuel injectors based on a response in an engine operating parameter following a fuel injection event of the one or more fuel injectors. In one embodiment, a method for an engine includes injecting a first pulse of fuel as a first pilot injection into a first subset of cylinders of a plurality of engine cylinders, where the first pilot injection precedes a primary injection of fuel into the first subset of cylinders by a pre-set duration; correlating a first response in an engine operating parameter to the first pilot injection; and adjusting the primary injection of fuel into the first subset of cylinders based on the first response. In one example, the engine operating parameter may be engine speed. In another example, the engine operating parameter may be engine knock. In yet another example, the engine operating parameter may be engine misfire. In yet another example, the engine operating parameter may be engine (individual cylinder generated) torque. A condition of a first fuel injector injecting the first pulse of fuel may be diagnosed based on a change in the first response over a number of first pilot injections. In a different embodiment, where engine instantaneous torque can be measured, a method for an engine includes injecting fuel into each cylinder of a plurality of cylinders of the engine over a single engine cycle via a plurality of fuel injectors, where each fuel injector of the plurality of fuel injectors is coupled to a different cylinder of the plurality of cylinders; determining individual torque output resulting from the injection of fuel into each cylinder; and indicating degradation of one or more of the plurality of fuel injectors in response to a variation in the determined individual engine (cylinder) torque output being greater than a threshold torque level. In yet another embodiment, a method for an engine includes injecting fuel into each cylinder of a plurality of cylinders of the engine over a single engine cycle via a plurality of fuel injectors, where each fuel injector of the plurality of fuel injectors is coupled to a different cylinder of the plurality of cylinders; determining individual engine speed accelerations resulting from the injection of fuel into each cylinder; and indicating degradation of one or more of the plurality of fuel injectors in response to a variation in the determined individual engine speed accelerations being greater than a threshold acceleration level.

Figure 1:
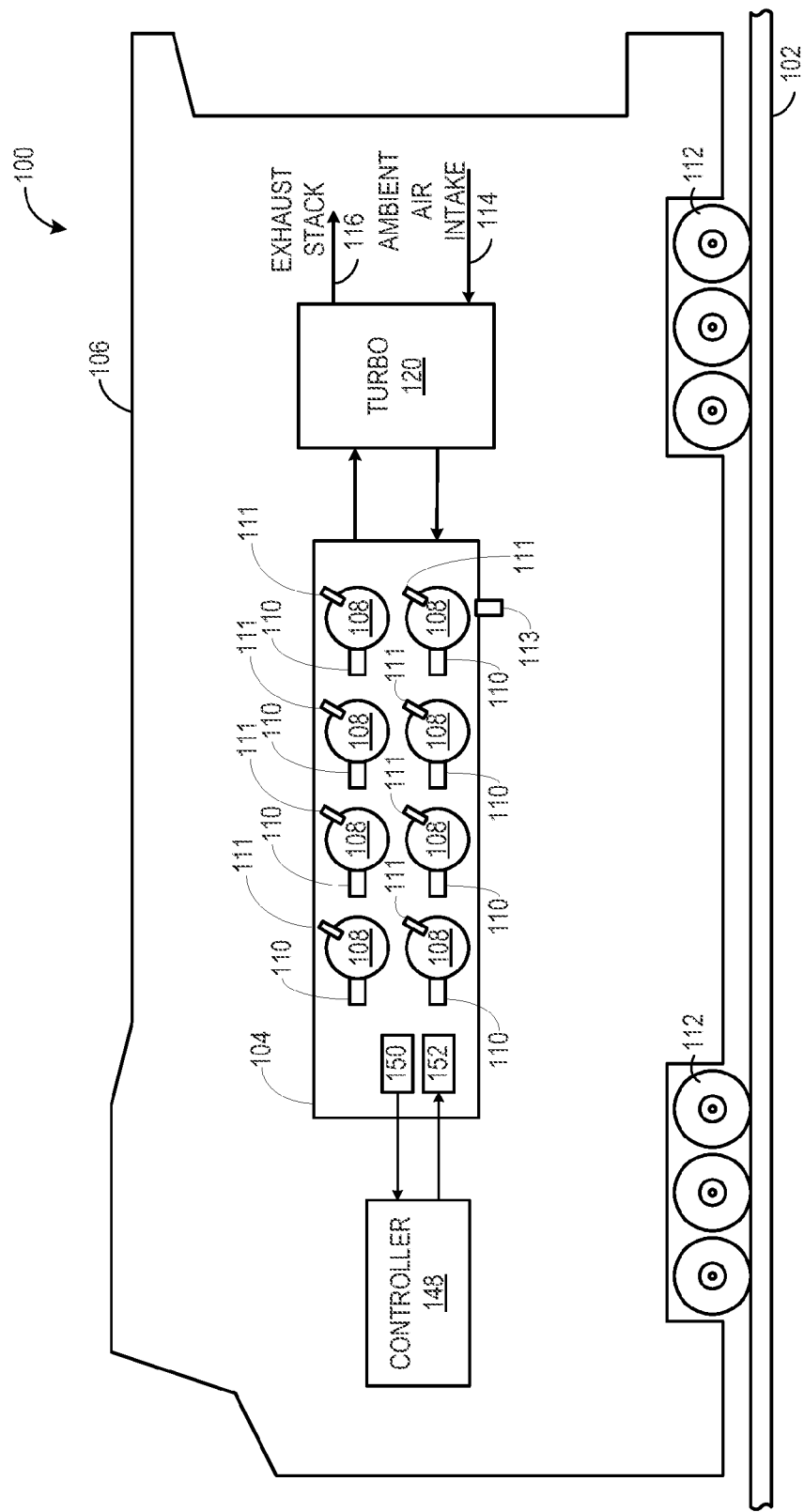
FIG. 1 shows a schematic diagram of a vehicle with an engine according to an embodiment of the disclosure.
Figure 2:
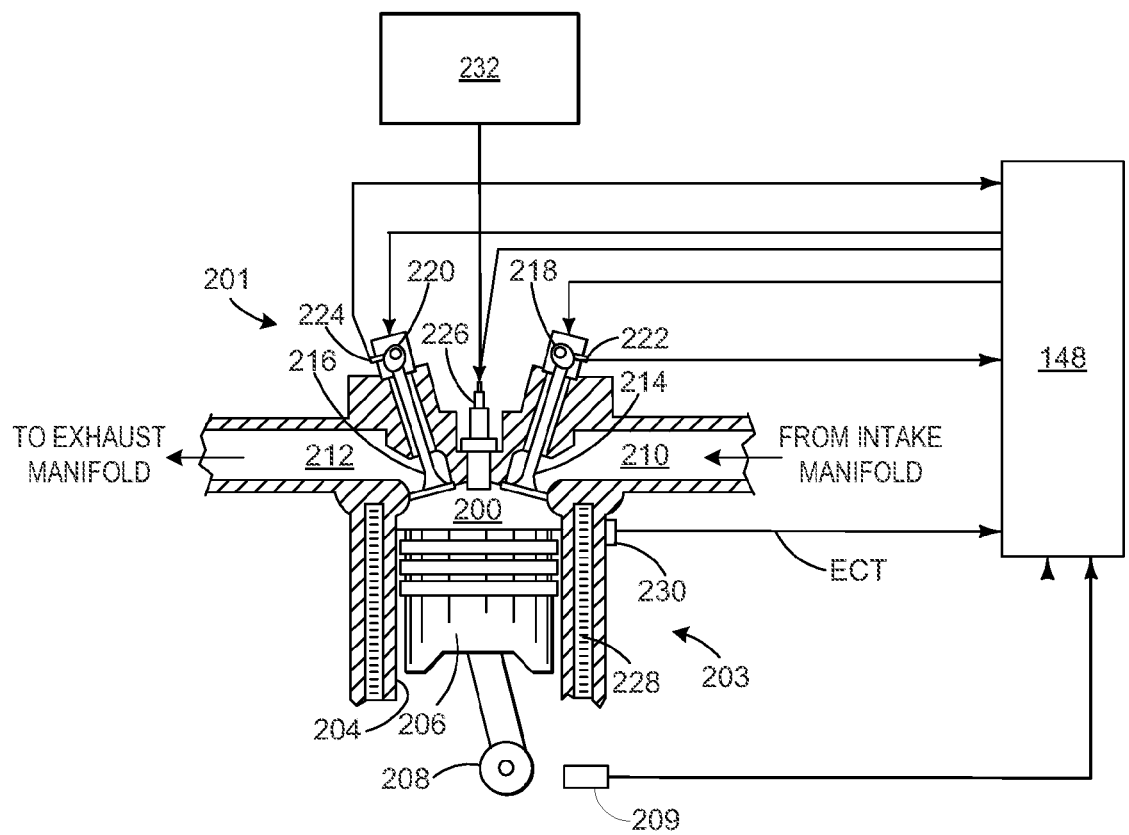
FIG. 2 shows a schematic diagram of a cylinder of the engine of FIG. 1, according to an embodiment of the disclosure.
Figure 3:
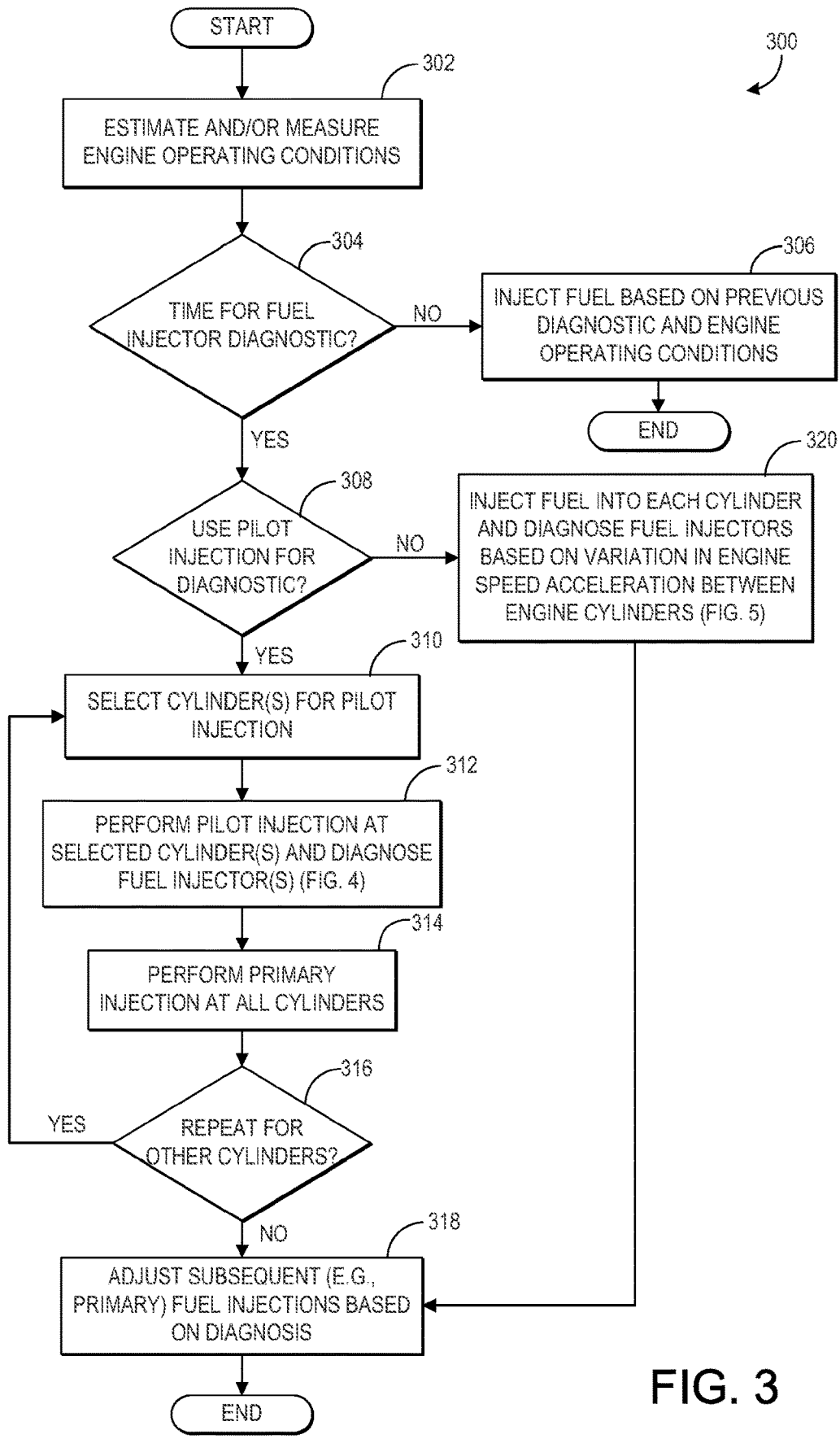
FIG. 3 shows a flow chart of a method for adjusting fuel injection via one or more fuel injectors based on a response in an engine operating parameter following a fuel injector injection event, according to an embodiment of the disclosure.
Figure 4:
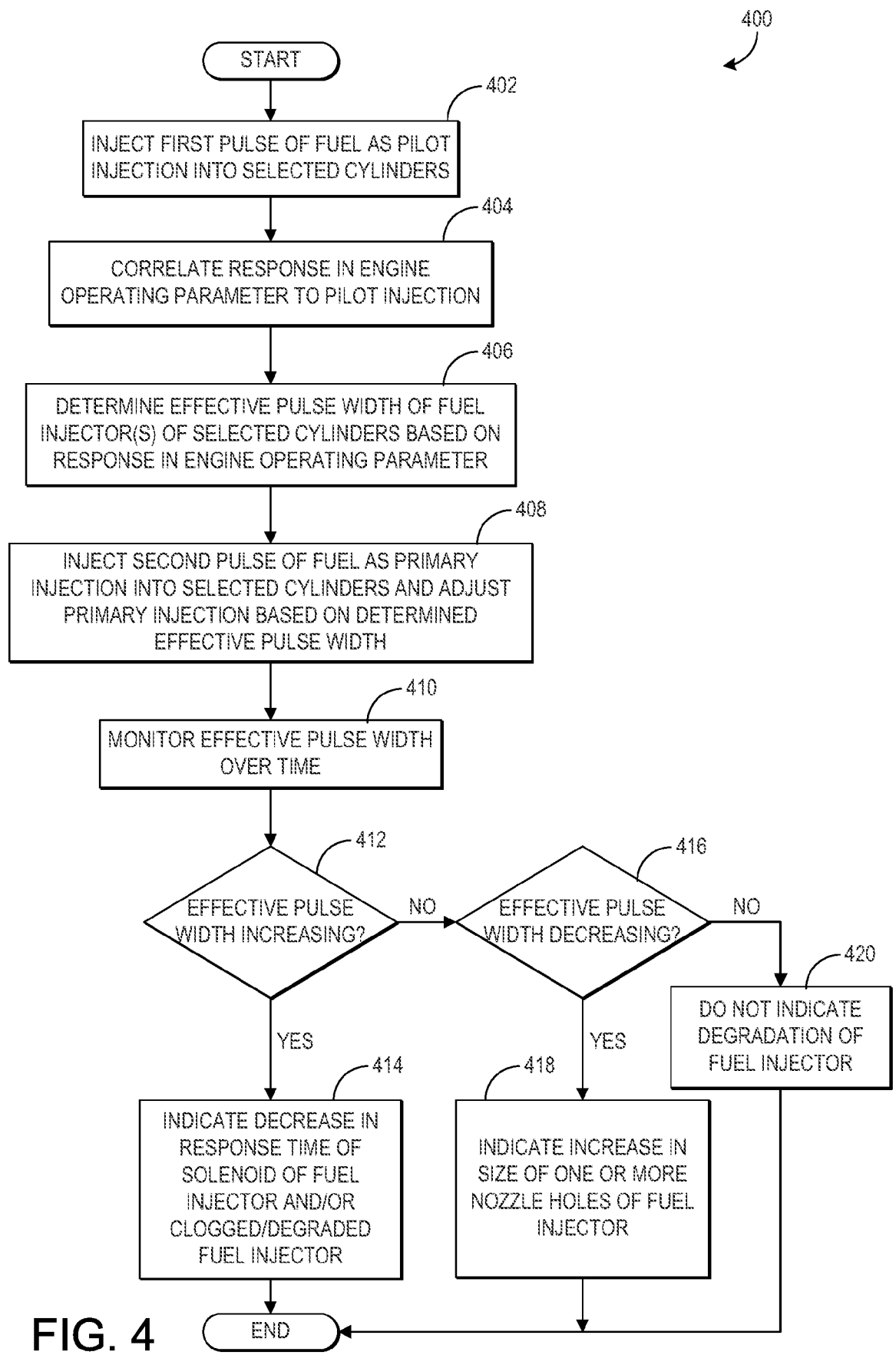
FIG. 4 shows a flow chart of a method for diagnosing a condition of a fuel injector based on a response in an engine operating parameter following performing a pilot injection with the fuel injector, according to an embodiment of the disclosure.
Figure 5:
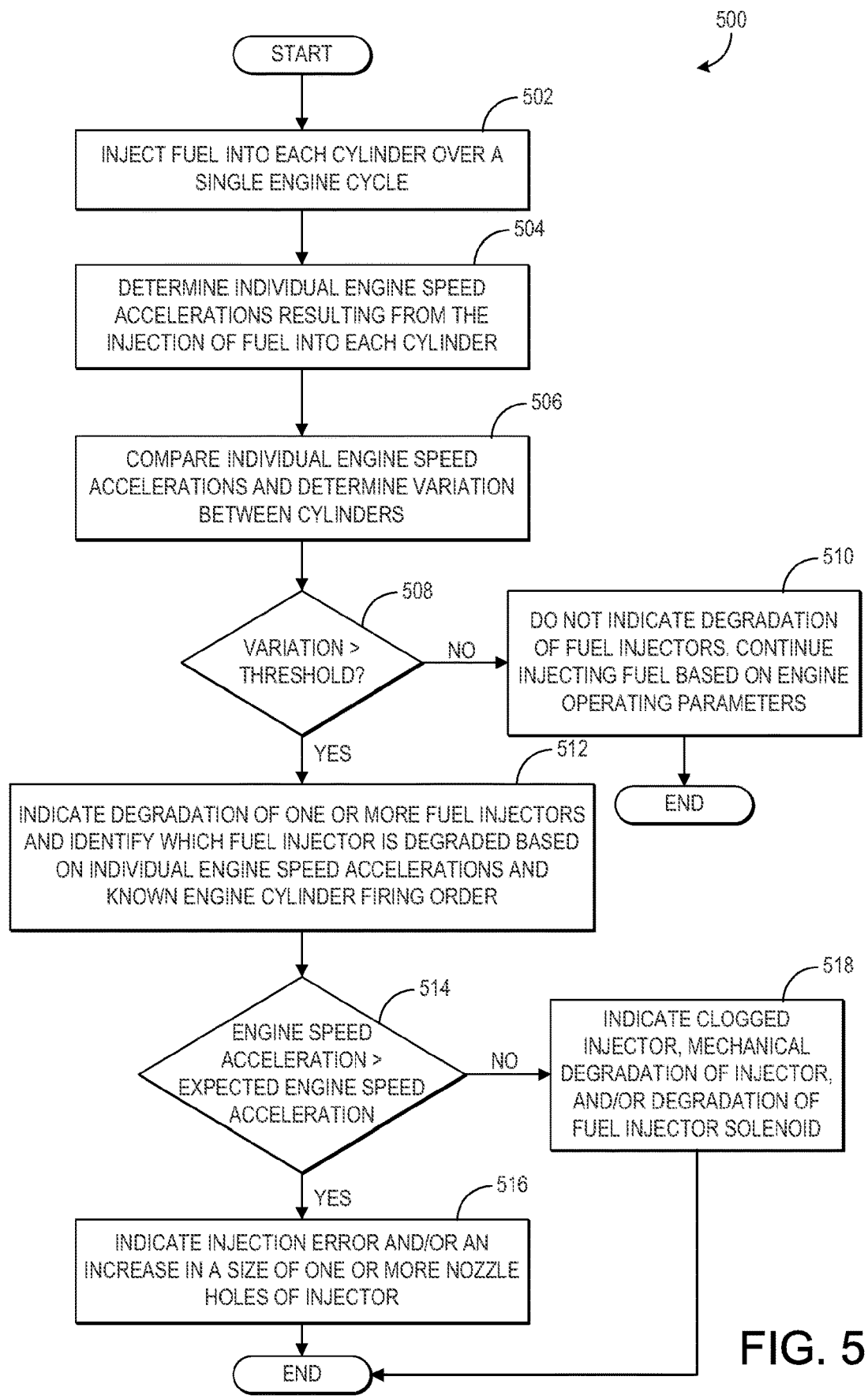
FIG. 5 shows a flow chart of a method for diagnosing a condition of one or more fuel injectors based on variations in engine speed accelerations after injecting fuel into each cylinder, according to an embodiment of the disclosure.
Figure 6:
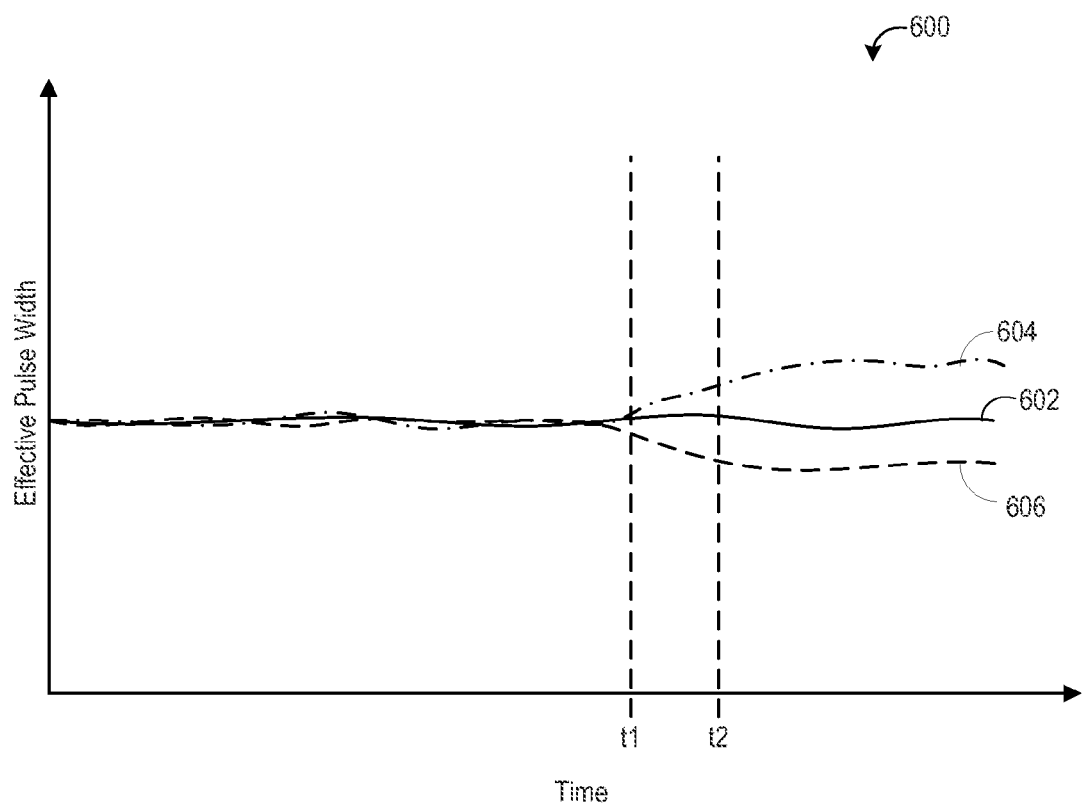
FIG. 6 shows a graph of changes to an effective pulse width of a fuel injector over time and a number of pilot injection events, according to an embodiment of the disclosure.
Figure 7:
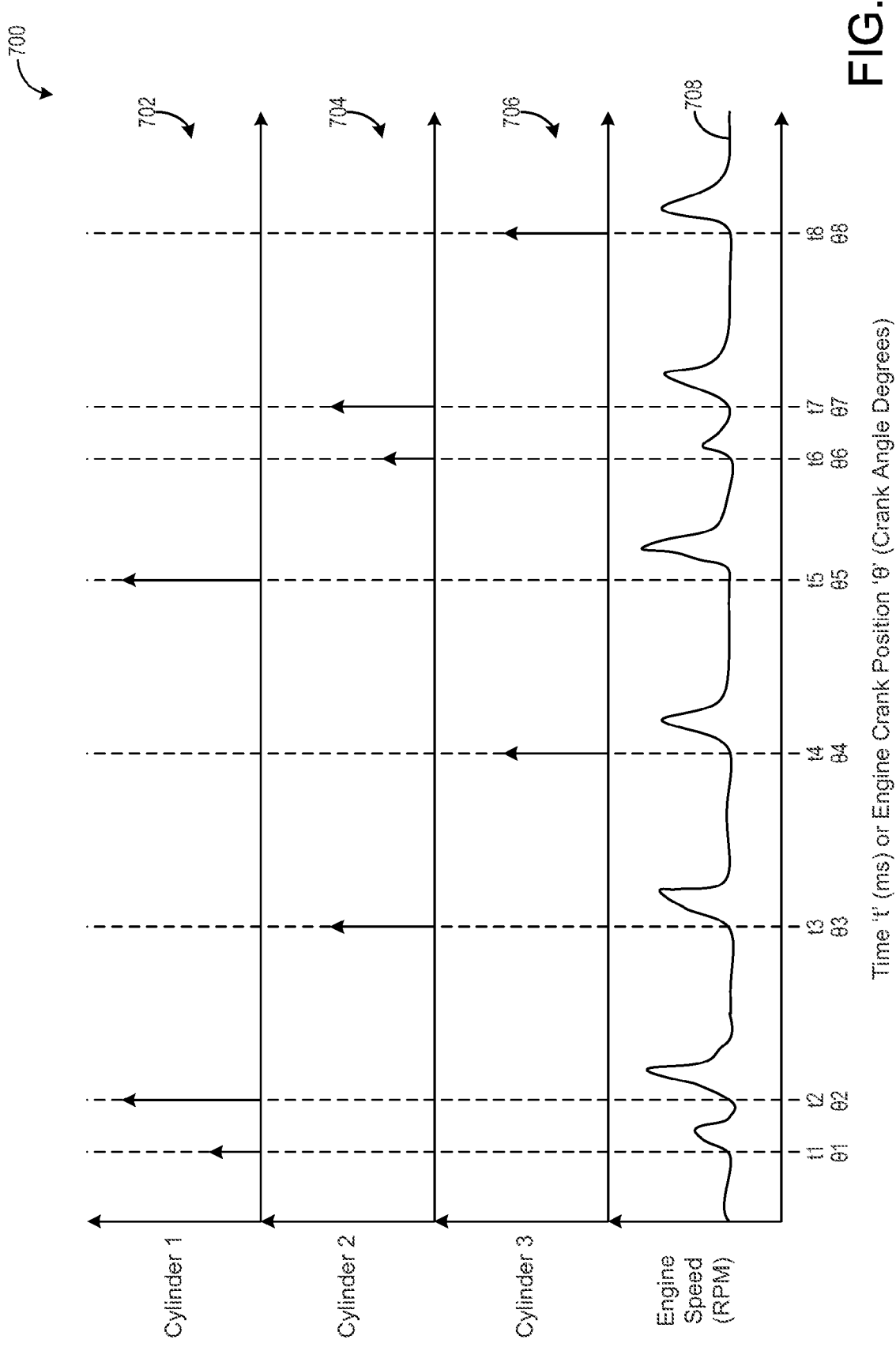
FIG. 7 shows a graph of performing pilot injections at different cylinders during different engine cycles and adjusting subsequent fuel injection events based on a response in an engine operating parameter due to the pilot injections, according to an embodiment of the invention.

FIG. 1 shows an engine including a plurality of cylinders, each cylinder including a fuel injector. Each time one of the fuel injector fires (e.g., injects fuel into the cylinder which it is coupled to), a speed of the engine (e.g., engine speed) may increase. For example, a spike in engine speed from a baseline (just prior to injector firing) engine speed may occur following an injection of fuel into an engine cylinder. The increase in engine speed may be measured via an engine speed sensor, such as the crankshaft speed sensor shown in FIG. 2. As a fuel injector ages or becomes degraded, it may inject a different fuel amount than commanded in response to a control signal sent to the fuel injector. By monitoring changes in an operating parameter of the engine, such as engine speed, engine torque output, engine knock, or engine misfire, a change in performance (from a baseline or commanded value) may be determined, thereby enabling diagnosis of the fuel injectors. In one example, as shown in the method of FIG. 4, a pilot injection may be delivered via a single fuel injector and a response in an engine operating parameter as a result of the pilot injection may be used to diagnose the fuel injector. For example, as shown in FIG. 6, the fuel injector may be diagnosed based on changes to an effective pulse width of the pilot injection of the fuel injector over time, where the effective pulse width is determined based on the response in the engine operating parameter. Further, as shown in FIG. 7, the method shown in FIG. 4 may be repeated during different engine cycles for each fuel injector and the corresponding cylinder which the fuel injector is coupled to. In another example, as shown in the method of FIG. 5, a primary injection of fuel may be delivered to each cylinder via the fuel injectors and the individual engine speed accelerations resulting from the injection of fuel into each cylinder may be compared between the cylinders. The variation in engine speed acceleration between each cylinder, the individual engine speed acceleration values, and a known firing order of the engine cylinders may then be used to diagnose the fuel injectors and to identify/determine which specific fuel injector or injectors are degraded and injecting less fuel or more fuel, outside of the allowable tolerance. Additionally, as shown in the method of FIG. 3, fuel injection via the fuel injectors (e.g., the amount or pulse width of fuel injected) may then be adjusted based on the diagnosis of the fuel injectors and/or the determined engine parameter responses. In this way, a change in performance of one or more fuel injectors may be diagnosed and engine operation may be adjusted to account for the change in performance. As a result, engine emissions may be maintained at a desired level and engine performance and efficiency may be increased.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for diagnosing a change in performance of fuel injectors of an engine, an example of a platform is disclosed in which the engine may be installed in a vehicle, such as a rail vehicle. FIG. 1 shows a block diagram of an embodiment of a vehicle system 100 (e.g., a locomotive system), herein depicted as vehicle 106. The illustrated vehicle is a rail vehicle configured to run on a rail 102 via a plurality of wheels 112. As depicted, the vehicle includes an engine system with an engine 104. In one embodiment herein, the engine is a multi-fuel engine operating with diesel fuel and natural gas, but in other examples the engine may use various combinations of fuels other than diesel and natural gas (such as any combination of diesel, gasoline, natural gas, or other fuel blends). In yet another embodiment, the engine may be a single-fuel engine operating with only one fuel, such as diesel fuel or direct injection of gasoline (such as GDI) or direct injection of natural gas injected (such as HPDIGAS) into the engine cylinder.

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system includes a turbocharger 120 ("TURBO") that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages. In other embodiments, the engine system may be naturally aspirated receiving fresh air charge for in-cylinder combustion and not include a turbocharger.

In some embodiments, the engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NOx trap, as well as filters or other systems and devices.

A controller (e.g., electronic controller having one or more processors) 148 may be employed to control various components related to the vehicle system. In one example, the controller includes a computer control system. The controller further includes computer readable storage media (e.g., memory) including code for enabling on-board monitoring and control of rail vehicle operation. The controller, while overseeing control and management of the vehicle system, may receive signals from a variety of sensors 150, as further elaborated herein, to determine operating parameters and operating conditions, and correspondingly adjust various engine actuators 152 to control operation of the vehicle. For example, the controller may receive signals from various engine sensors including, but not limited to, engine speed, engine torque output, engine load, boost pressure, exhaust pressure, ambient pressure, exhaust temperature, knock, misfire, and the like. Correspondingly, the controller may control aspects and operations of the vehicle system by sending commands to various components such as traction motors, alternator or generator, cylinder valves, air and/or fuel throttle, fuel injectors, and the like.

As shown in FIG. 1, the engine includes a plurality of cylinders 108. Though FIG. 1 depicts an engine with eight cylinders, other numbers of cylinders are possible. Each cylinder of the engine may include a knock sensor 110 and a fuel injector 111. Each fuel injector may inject fuel into the cylinder which it is coupled to at a different time than the other fuel injectors. The order in which each fuel injector fires (e.g., injects fuel into the corresponding cylinder) may be referred to herein as the cylinder firing order. For a single engine cycle, each fuel injector may fire at a different time within the cylinder firing order. For example, each fuel injector may deliver one primary injection into the cylinder which it is coupled to in a single engine cycle. In some embodiments, as described further below, one fuel injector of one cylinder for the single engine cycle may additionally perform a pilot injection, before its primary injection, in order to diagnose the performance of the fuel injector (as described further below with reference to FIGS. 3-4 and 6-7).

In some embodiments, as shown in FIG. 1, the engine includes one engine crankshaft torque output sensor 113 for the entire engine, and a torque contribution to the crankshaft from each individual cylinder can be measured and determined based on torque data associated with the specific contributing cylinder. In one example, the torque sensor may be a contact type or contactless type or slip-ring type. Each of the types may use strain gauge, piezo-electric, or such other technologies. The torque sensor may output a voltage which is then received as a voltage signal at the controller. In one embodiment, the controller processes the voltage signal from the torque sensor to determine a corresponding cylinder-by-cylinder torque output for the entire engine, for each full cycle of engine operation, and subsequently adjust engine operation based on the received data. In another example, the controller may determine cylinder misfire based on the output of the torque sensor, a crankshaft position output (e.g., via a crankshaft position or speed sensor, as shown in FIG. 2 and described further below), and a known cylinder firing order of the engine (e.g., the cylinder number order in which fuel is injected into each cylinder and then combusted). As described further below with reference to FIGS. 3-4, the controller may adjust fueling to the engine cylinders and/or diagnose a condition of the fuel injectors based on the received data from the torque output sensor.

Since the engine includes one knock sensor for each cylinder, each individual cylinder knock sensor may measure data associated with the cylinder it is coupled to. In one example, the knock sensor may be a strain gauge based or accelerometer based knock sensor. The knock sensor may output a voltage which is then received as a voltage signal at the controller. In one embodiment, the controller processes the voltage signal from the knock sensor to determine a corresponding indicated mean effective pressure (IMEP) value and/or peak cylinder pressure (PCP) value (or a maximum acceleration value associated with the PCP) for the individual cylinder which the knock sensor is coupled to. Thus, the controller receives data from each knock sensor of each engine cylinder of the engine and processes the received data to indicate engine cylinder knock, determine the indicated IMEP and/or PCP, and subsequently adjust engine operation based on the received data. In another example, the controller may determine cylinder misfire based on the output of the knock sensors, a crankshaft position output (e.g., via a crankshaft position or speed sensor, as shown in FIG. 2 and described further below), and a known cylinder firing order of the engine (e.g., the cylinder number order in which fuel is injected into each cylinder and then combusted). As described further below with reference to FIGS. 3-4, the controller may adjust fueling to the engine cylinders and/or diagnose a condition of the fuel injectors based on the received data from the knock sensors.

FIG. 2 depicts an embodiment of a combustion chamber, or cylinder 200, of a multi-cylinder internal combustion engine, such as the engine 104 described above with reference to FIG. 1. Cylinder 200 may be a representative cylinder for cylinders 108 in FIG. 1. Additionally, the cylinder shown in FIG. 2 may be defined by a cylinder head 201, housing the intake and exhaust valves and fuel injector, described below, and a cylinder block 203. In some examples, each cylinder of the multi-cylinder engine may include a separate cylinder head coupled to a common cylinder block.

The engine may be controlled at least partially by a control system including controller 148 which may be in further communication with a vehicle system, such as the vehicle system 100 described above with reference to FIG. 1. As described above, the controller may further receive signals from various engine sensors including, but not limited to, engine speed from a crankshaft speed sensor 209, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. In one example, the crankshaft speed sensor may be a Hall effect sensor, variable reluctance sensor, linear variable differential transducer, an optical sensor, or other types/forms of speed sensors, configured to determine crankshaft speed (e.g., RPM) based on the speed of one or more teeth on a wheel of the crankshaft. In another example, the crankshaft speed sensor may also determine a position of the crankshaft. Correspondingly, the controller may control the vehicle system by sending commands to various components such as alternator/generator, cylinder valves, air and/or fuel throttle, fuel injectors, etc.

As shown in FIG. 2, the controller receives a signal (e.g., output) from the crankshaft speed sensor. In one example, this signal (which may be an analog output that includes a pulse each time a tooth of the wheel of the crankshaft passes the crankshaft speed sensor) may be converted by a processor of the controller into an engine speed (e.g., RPM) signal. The controller may then use the engine speed signal to adjust engine operation (e.g., adjust primary fueling to the cylinder).

The cylinder (i.e., combustion chamber) 200 may include combustion chamber walls 204 with a piston 206 positioned therein. The piston may include a piston ring and/or liner disposed between an outer wall of the piston and the inner wall of the cylinder. The piston 206 may be coupled to a crankshaft 208 so that reciprocating motion of the piston is translated into rotational motion of the crankshaft. In some embodiments, the engine may be a four-stroke engine in which each of the cylinders fires (e.g., fuel is injected into each cylinder) in accordance with a firing order during two revolutions of the crankshaft. In other embodiments, the engine may be a two-stroke engine in which each of the cylinders fires in a firing order during one revolution of the crankshaft.

The cylinder 200 receives intake air for combustion from an intake including an intake runner (or manifold) 210. The intake runner 210 receives intake air via an intake manifold. The intake runner 210 may be configured such that there is one runner per cylinder or such that a single intake runner communicates with multiple cylinders (e.g. one runner per bank of a V-engine which communicates with all cylinders on a bank, wherein the V-engine consists of two runners) of the engine in addition to the cylinder, for example, or the intake runner 210 may communicate exclusively with that one cylinder.

Exhaust gas resulting from combustion in the engine is supplied to an exhaust including an exhaust runner 212. Exhaust gas flows through the exhaust runner 212, to a turbocharger in some embodiments (turbocharger not shown in FIG. 2) and to atmosphere, via an exhaust manifold. The exhaust runner 212 may further receive exhaust gases from other cylinders of the engine in addition to the single cylinder (as shown), for example.

Each cylinder of the engine may include one or more intake valves and one or more exhaust valves. For example, the cylinder in FIG. 2 is shown including at least one intake poppet valve 214 and at least one exhaust poppet valve 216 located in an upper region of cylinder. In some embodiments, each cylinder of the engine may include at least two intake poppet valves and at least two exhaust poppet valves located at the cylinder head.

The intake valve 214 may be controlled by the controller via an actuator 218. Similarly, the exhaust valve 216 may be controlled by the controller via an actuator 220. During some conditions, the controller may vary the signals provided to the actuators 218 and 220 to control the opening and closing of the respective intake and exhaust valves. The position of the intake valve 214 and the exhaust valve 216 may be determined by respective valve position sensors 222 and 224, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto (as shown in FIG. 1). As a non-limiting example, FIG. 2 shows the cylinder including a fuel injector 226. The fuel injector 226 is shown coupled directly to the cylinder for injecting fuel directly therein. In this manner, fuel injector 226 provides what is known as direct injection of a fuel into the cylinder. The fuel may be delivered to the fuel injector 226 from a high-pressure fuel system including a fuel tank 232, fuel pumps, and a fuel rail (not shown). In one example, the fuel is diesel fuel that is combusted in the engine through compression ignition. In other non-limiting embodiments, the fuel may be gasoline, kerosene, jet fuel, heavy hydrocarbon oils derived from petroleum crudes, heavy non-petroleum hydrocarbon oils, heavy biodiesel, or other petroleum distillates of similar density through compression ignition (and/or spark ignition). In other embodiments, the fuel may be a combination of two or more of these different types of fuel. In yet other embodiments, ignition of the fuel-air mixture is achieved through the use of laser or plasma ignitors. Further, each cylinder of the engine may be configured to receive gaseous fuel (e.g., natural gas) alternative to or in addition to diesel fuel. The gaseous fuel may be provided to the cylinder via the intake manifold, as explained below, or other suitable delivery mechanism or mechanisms such as multi-port injection of gaseous fuel very close to the intake valve(s) of each cylinder or direct injection of gaseous fuel in to the engine cylinder.

Turning to FIG. 3, a method 300 for adjusting fuel injection of one or more fuel injectors of an engine based on a response in an engine operating parameter following a fuel injector injection event is shown. As explained above, at least one fuel injector may be coupled to each cylinder (such as fuel injectors 111 shown in FIG. 1 and/or fuel injector 226 shown in FIG. 2). Further, each fuel injector of each cylinder may fire (e.g., inject fuel) at a different time in a single engine cycle according to a cylinder firing order of the engine (e.g., cylinder 1, cylinder 2, cylinder 3 . . . ). Accordingly, after each injection of fuel into a cylinder, an engine operating parameter may change in response to the injection. This change in engine operating parameter may be used to determine a change in performance of one or more of the fuel injectors from what is expected. Instructions for carrying out method 300 and the rest of the methods included herein may be executed by a controller (such as controller 148 shown in FIGS. 1-2) based on instructions stored in the memory of the controller and in conjunction with signals received from sensors of the engine system, such as the sensors described above with reference to FIGS. 1-2 (e.g., knock sensors 110 and crankshaft speed sensor 209). The controller may employ engine actuators of the engine system (such as actuators of fuel injectors) to adjust engine operation, according to the methods described below.

At 302, the method includes estimating and/or measuring engine operating conditions. Engine operating conditions may include one or more of engine speed, engine torque output, a knock level, misfire indication, engine load, mass air flow, engine temperature, ambient pressure, ambient temperature, peak cylinder pressure (PCP), indicated mean effective pressure (IMEP), or the like. At 304, the method includes determining whether it is time for a fuel injector diagnostic. In one example, a fuel injector diagnostic may be requested or performed automatically after a duration of engine operation, a number of engine cycles, a number of fuel injection events for each fuel injector, and/or a distance of vehicle travel. In another embodiment, a fuel injector diagnostic may be performed during each engine cycle. In yet another embodiment, a fuel injector(s) diagnostic may be performed either just after engine start-up, or just before engine shut-down, or both start-up and shut-down. If it is not time to perform the fuel injector diagnostic, the method continues to 306. At 306, the method includes injecting fuel via one or more fuel injectors into each cylinder based on a previous fuel injector diagnostic and current engine operating conditions. As explained further below, during a fuel injector diagnostic, the performance of the fuel injectors may be determined and compared to expected values. If the fuel injector performance of one or more fuel injectors is different than expected (but still within the confines of pre-defined lower limit and upper limit of performance), the controller may adjust fuel injection (e.g., via adjusting a pulse width of fuel injected by the fuel injector) to deliver a desired amount of fuel and account for the change in performance.

Alternatively, at 304, if it is time for a fuel injector diagnostic, the method continues to 308 to determine whether to use a pilot injection for the diagnostic. In one example, as explained further below, a pilot injection may be performed via a fuel injector, in addition to and before the primary fuel injection (e.g., main injection). For example, the primary fuel injection may inject a larger pulse of fuel during a compression stroke of the cylinder (e.g., in a four-stroke cycle which includes intake, compression, combustion, and exhaust strokes) and the pilot injection may inject a smaller pulse of fuel separate from and prior to the primary fuel injection during the same cycle of the same cylinder. In one example, the pilot injection method for diagnosing fuel injector performance may be used when set operating conditions for performing the diagnostic are met. In one example, the set operating conditions may include a selected notch level or range of notch levels (e.g., notch eight), engine speed within a threshold range (e.g., between a lower threshold engine speed and an upper threshold engine speed), and/or an engine power level within a threshold range (e.g., between a lower threshold power level and an upper threshold power level).

If the conditions for diagnosing the fuel injectors via pilot injection at 308 are not met, the method continues to 320. At 320, the method includes injecting fuel into each cylinder of the engine and diagnosing the fuel injectors based on a variation in engine speed acceleration between the engine cylinders. The method at 320 is expanded upon in method 500 of FIG. 5, as described further below. Alternatively, at 308, if the conditions for diagnosing the fuel injectors via pilot injection are met, the method continues to 310 to select an individual cylinder or group of cylinders for pilot injection. In one embodiment, only one cylinder may receive a pilot injection via its fuel injector during a single engine cycle. For example, during a single engine cycle including performing a primary injection at each cylinder, according to the cylinder firing order, only one fuel injector of one cylinder may additionally perform the pilot injection. In this way, an engine operating parameter response due to the pilot injection may be registered and correlated to the one fuel injector that performed the pilot injection. As such, only one fuel injector of one cylinder may be diagnosed at a time (e.g., during a single engine cycle). The method at 310, 312, and 314 may then be repeated for each fuel injector of each cylinder during different engine cycles, as explained further below. In another embodiment, more than one cylinder may receive the pilot injection during a single engine cycle. However, these cylinders may be adequately and/or significantly separated from one another in the cylinder firing order (e.g., they may not be fired sequentially, one after the other) so that the engine operating parameter response due to each pilot injection may be correlated to the correct fuel injector or fuel injectors. In this way, a subset (single or group) of the engine cylinders may receive the pilot injection during the same engine cycle but at different times during that engine cycle.

After selecting the cylinder(s) and corresponding fuel injector(s) for the pilot injection, the method continues to 312 to perform the pilot injection at the selected cylinder (or cylinders) and diagnose the fuel injector(s) according to the method 400 presented at FIG. 4 (as described further below). As explained further below, in one example, diagnosing the fuel injector may include determining an effective pulse width of the pilot injection for achieving a pre-defined engine parameter (such as engine speed), comparing it to an expected pulse width, and determining degradation or a change in performance of the fuel injector based on how the effective pulse width changes over time. Following performing the pilot injection, the method continues to 314 to perform the primary fuel injection at the selected cylinder and all other cylinders of the engine (unless one or more cylinders are being skip fired). After all firing cylinders have been fired (via primary fuel injection) during the engine cycle, the method continues to 316 to determine whether the fuel injector diagnostic should be repeated for one or more of the other cylinders (and corresponding fuel injectors). If the diagnostic should be repeated, the method circles back to 310.

However, if the diagnostic is not to be repeated for the other cylinders (e.g., if the diagnostic has already been performed for all fuel injectors), the method continues to 318 to adjust subsequent fuel injections (e.g., subsequent primary injections during the next or following engine cycles for the diagnosed fuel injectors) based on the results of the diagnosis. For example, the method at 318 may include adjusting the amount of fuel or pulse width of fuel injected via the primary injection of a diagnosed fuel injector based on a determined engine speed, engine torque output, engine knock, or engine misfire response during the pilot injection (if continuing from 318) or the engine speed acceleration response during injecting fuel into each cylinder (if continuing from 320). For example, the controller may determine a control signal to send to the fuel injector actuator, such as an updated primary pulse width of the signal being determined based on a determination of the engine operating parameter response during the diagnostic routine. The controller may determine the pulse width through a determination that directly takes into account a determined effective pulse width (as described further below with regard to method 400) or a determined engine speed acceleration (as described further below with regard to method 500), such as decreasing the primary effective pulse width or decreasing engine speed acceleration. The controller may alternatively determine the pulse width based on a calculation using a look-up table with the input being the effective pulse width, engine operating parameter response to the pilot injection, and/or the engine speed acceleration, and the output being the new or updated or commanded pulse-width.

In one embodiment of method 300, each of the methods at 312 and 320 may additionally include controlling a turbocharger (such as turbocharger 120 shown in FIG. 1) and/or an amount of intake air entering the engine cylinders to a steady-state level. For example, this may include operating the turbocharger at a steady (and not changing) boost level. In another example, this may include maintaining a position of an air throttle in the intake passage at a set position. As a result, the air-fuel ratio entering the engine cylinders may not change during the testing (e.g., diagnosing) period due to the airflow.

FIG. 4 shows a method 400 for diagnosing a condition of a fuel injector based on a response in an engine operating parameter following performing a pilot injection with the fuel injector. Method 400 may continue from the method at 312 in FIG. 3. As such, method 400 begins at 402 by injecting a first pulse of fuel as a pilot injection into the selected cylinder(s). For example, the method at 402 may include injecting the first pulse of fuel via a first fuel injector coupled to the selected cylinder. In one example, the method at 402 may also include determining an amount or pulse width of the first pulse. The amount or pulse width of the first pulse of fuel may be smaller than a second pulse of fuel injected during the primary injection event of the first fuel injector (e.g., the primary injection being a main injection occurring separate from and after the pilot injection, as explained above). In another example, the amount or pulse width of the first pulse of fuel may be selected based on an amount of fuel that will cause a detectable change in an engine operating parameter (for diagnosing the fuel injector). For example, the first pulse of fuel must be large enough so that an engine speed sensor may detect a change in engine speed from a baseline engine speed after performing the pilot injection. After performing the pilot injection at 402, the method continues to 404.

At 404, the method includes correlating a response in an engine operating parameter to the pilot injection. As explained above, after injecting the first pulse of fuel as the pilot injection via the first fuel injector, an engine operating parameter may change due to (e.g., in response to) the pilot injection. This change from baseline of the engine operating parameter may then be correlated with the pilot injection. As one example, the engine operating parameter may be engine speed and the response in the engine operating parameter may be an increase (e.g., spike) in engine speed from a baseline engine speed (prior to the pilot injection) to engine speed after the pilot injection. As another example, the engine operating parameter may be the engine torque output measured via a torque sensor coupled to the engine crankshaft. The measured torque level may register the actual combustion noise due to the pilot injection. As one example, the response in the engine operating parameter may be the change in the torque level determined from the torque sensor output. In yet another example, the engine operating parameter may be a misfire level or indication determined from an output of the torque sensor. As another example, the engine operating parameter may be a knock level output via a knock sensor coupled to the cylinder that the first fuel injector is coupled to. The knock level may register the actual combustion noise due to the pilot injection. As one example, the response in the engine operating parameter may be the change in the IMEP or PCP determined from the knock sensor output. In yet another example, the engine operating parameter may be a misfire level or indication determined from an output of the knock sensor.

At 406, the method includes determining the effective pulse width of the pilot injection of the fuel injector of the selected cylinder(s) based on the response in the engine operating parameter determined at 404. In one example, determining the effective pulse width may include the controller making a logical determination of the effective pulse width of the pilot injection based on logic rules that are a function of the engine operating parameter (e.g., engine speed, engine torque output, engine knock, IMEP, PCP, and/or engine misfire). As one example, the controller may receive the engine speed signal from the engine speed sensor before, during, and after the pilot injection, determine the change in the engine speed signal from the baseline engine speed due to the pilot injection, and determine (e.g., calculate as a function of the change in engine speed or use a look-up table with the input being the change in engine speed due to the pilot injection) the effective pulse width of the pilot injection. In another example, the controller may compare the knock signature received from the knock sensor following the pilot injection to a reference knock sensor signature and then determine the effective pulse width. For example, the controller may determine the effective pulse width as a function of the measured knock signature following the pilot injection and the reference knock signature.

At 408, the method includes injecting a second pulse of fuel as a primary injection into the selected cylinder(s) and adjusting the primary injection based on the determined effective "primary" pulse width. For example, the controller may compare the determined effective pulse width to the commanded pulse width for the first amount of fuel of the pilot injection. If the effective pulse width was larger than commanded, then too much fuel may have been injected via the first injector. Alternatively, if the effective pulse width was smaller than commanded, then too little fuel may have been injected via the first injector. As a result, the controller may compensate for this difference by adjusting the primary injection amount (e.g., increase if the effective pilot pulse width was too small and decrease if the effective pilot pulse width was too large). Specifically, the controller may make a logical determination of the pulse width of the second pulse of fuel for the primary injection of the selected cylinder based on logic rules that are a function of the determined effective pilot pulse width. In this way, the controller may correct/adjust subsequent fuel injections with the injector of the selected cylinder to account for degradation, aging, or faults of the fuel injector or fuel injector components (e.g., nozzle fuel spray holes, solenoids, or the like).

At 410, the method includes monitoring (e.g., tracking) the effective pulse width of the fuel injector over time. For example, for each pilot injection event (during the injector diagnostic) of a single fuel injector, the controller may determine the effective pulse width and track changes to the effective pilot pulse width over time and over a number of pilot injections. For example, FIG. 6 shows a graph 600 of example changes to an effective pulse width of a fuel injector over time and a number of pilot injection events. Specifically, graph 600 shows a first plot 602 of a baseline effective pulse width that does not change significantly (e.g., greater than a threshold amount of change) over time. Graph 600 also shows a second plot 604 where the effective pulse width increases over time and a third plot 606 where the effective pulse width decreases over time. At time t1, the effective pulse width of the second plot 604 and the third plot 606 begin changing and at time t2 the effective pulse widths of these two plots may change by an amount that exceeds the threshold amount of change. As a result, the controller may indicate degradation or a change in performance of the fuel injector, as explained further below.

Returning to FIG. 4, at 412 the method includes determining if the effective pulse width is increasing (e.g., as shown at plot 604 in FIG. 6). In one example, the controller may determine the effective pulse width is increasing if a rate of change of the effective pulse width is greater than a threshold rate of change. In another example, the controller may determine the effective pulse width is increasing if the most recent effective pulse width value is a threshold amount different than a previous effective pulse width value or an original effective pulse width value (e.g., the effective pulse width when the injector was new or used for the very first time for a pilot injection). If the effective pulse width is increasing, the method continues to 414 to indicate a change in performance of the fuel injector. As one example, the method at 414 may include indicating one or more of a decrease in response time of a solenoid of the fuel injector and/or a clogged or degraded fuel injector. In one example, the controller may send a notification (e.g., audible or visual) to a vehicle operator that the fuel injector needs to be serviced or replaced. Alternatively, at 412, if the effective pilot pulse width is not increasing, the method continues to 416 to determine if the effective pilot pulse width is decreasing (similar to as explained above for 412). If the effective pulse width is decreasing, the method continues to 418 to indicate one or more of an increase in a size of one or more nozzle fuel spray holes of the fuel injector and/or a faulty injector/injection. The controller may then send an indication to the vehicle operator, as described above. If the effective pilot pulse width is not increasing and/or not decreasing, the method instead continues to 420 to not indicate degradation of the fuel injector and to continue (normally) injecting fuel with the fuel injector.

Method 400 may be repeated for each cylinder (and fuel injector coupled to each cylinder) during different engine cycles. An example of performing pilot injections via two fuel injectors of two different cylinders during different engine cycles is shown in FIG. 7. Specifically, FIG. 7 shows a graph 700 showing fuel injection events at a first cylinder at plot 702, fuel injection events at a second cylinder at plot 704, fuel injection events at a third cylinder at plot 706, and changes in engine speed at plot 708. In the example shown in FIG. 4, the cylinder firing order may be cylinder 1-cylinder 2-cylinder 3. Prior to time t1, the controller may determine that it is time to perform a diagnostic of a first fuel injector coupled to the first cylinder. As such, at time t1, the first fuel injector injects a first pulse of fuel as a pilot injection into the first cylinder (plot 702). In response to injecting the first pulse of fuel, engine speed increases from the baseline value prior to the pilot injection (plot 708). During the pilot injection, no other cylinders are receiving fuel injections (e.g., no other fuel injectors are firing). At time t2, a duration after time t1, the controller actuates the first fuel injector to inject a second pulse of fuel as the primary injection into the first cylinder (plot 702). Since the engine speed response following the pilot injection may be smaller than expected for the commanded first pulse of fuel, the controller may increase the second pulse of fuel above a previously commanded amount (e.g., the amount of fuel injection for the primary injection at the first cylinder is larger than for the other cylinders in the firing order). In response to the injecting of the second "primary" pulse of fuel, engine speed increases. The increase in engine speed due to the primary injection is larger than the increase in engine speed due to the pilot injection since the second pulse of fuel is greater than the first pulse of fuel (as denoted by the height of the arrows in plot 702). The next cylinder in the firing order, cylinder 2, receives its primary injection of fuel via a second fuel injector at time t3 and then cylinder 3 receives its primary injection of fuel via a third fuel injector at time t4.

After time t4, the controller may determine that it is time to perform a diagnostic of the second fuel injector coupled to the second cylinder. As shown at time t5, the first fuel injector again injects fuel, but only as a primary injection, into the first cylinder. Additionally, the amount of fuel injected during the primary injection at time t5 is greater than the amount of fuel injected during the primary injections at the other cylinders. The second injector then injects a smaller, first pulse of fuel (at time t6) as the pilot injection into the second cylinder and then, at time t7, a larger, second pulse of fuel as the primary injection into the second cylinder. During the pilot injection into the second cylinder, no other fuel injectors of the other cylinders are injecting fuel. Finally, the third cylinder receives the primary injection of fuel from the third fuel injector at time t8. In this way, a pilot injection of fuel may be used to diagnose fuel injectors of different engine cylinders during different engine cycles. As a result, engine speed responses may be correlated to the pilot injection for the single cylinder receiving the pilot injection and then used to diagnose the performance of the fuel injector.

Turning to FIG. 5, a method 500 for diagnosing a condition of one or more fuel injectors based on a variation in engine speed accelerations after injecting fuel into each cylinder is shown. Method 500 may continue from the method at 320 in FIG. 3. As such, method 500 begins at 502 by injecting fuel into each cylinder over a single engine cycle. For example, every cylinder may receive a primary injection of fuel, at its time in the firing order, via the fuel injector coupled thereto. As a result, every fuel injector may fire once in the single engine cycle. At 504, the method includes determining individual engine speed accelerations resulting from the injection of fuel into each cylinder. For example, as shown in FIG. 7, every time fuel is injected into a cylinder, engine speed may increase (and accordingly the acceleration of the engine speed increases proportional to injected fuel quantity). The controller may receive the engine speed signal from an engine speed sensor during all the injection events and then correlate each engine speed acceleration (e.g., each peak in engine speed) to each fuel injector/cylinder based on the known firing order of the cylinders. As a result, the controller may make a logical determination of the individual engine speed accelerations for each fuel injector/cylinder based on logic rules that are a function of the received (e.g., measured) engine speed signal and the known firing order.

At 506, the method includes comparing the individual engine speed acceleration values for each fuel injector/cylinder and determining the variation in engine speed accelerations between the cylinders. In one example, a same amount of fuel may be injected into each cylinder via each corresponding fuel injector at 502. In another example, different amounts of fuel may be injected into each cylinder (e.g., due to variations in aging/deterioration/degradation of performance or characteristics of the fuel injectors). However, in both examples, approximately the same engine speed acceleration response may be expected due to fuel injection at each cylinder. In one example, determining the variation in the engine speed accelerations between the cylinders may include the controller calculating a standard deviation between the determined individual engine speed accelerations corresponding to each cylinder (e.g., each fuel injection event at each cylinder). At 508, the method includes determining whether the variation determined at 506 is greater than a threshold level. In one example, the threshold level may be a level that indicates a change in performance or degradation of one or more of the fuel injectors relative to the remaining fuel injectors. In one example, the allowable variation in fueling quantity (injection event-to-injection event or injector-to-injector) is within +/−1.5% of nominal quantity when the injector is new. In this example, the allowable variation on threshold prior to condemning an in-use injector and/or changing to a new injector is +/−3% or higher of nominal quantity.

If the determined variation is not greater than the threshold level, the method continues to 510 to not indicate degradation of the fuel injectors and to instead continue injecting fuel via the fuel injectors based on engine operating conditions. Alternatively, at 508, if the variation is greater than the threshold level, the method continues to 512 to indicate degradation of one or more of the fuel injectors and then identify which fuel injector (or injectors) is degraded based on the individual engine speed acceleration and the known engine cylinder firing order. For example, the controller may know the crankshaft position (e.g., angle) at which each individual engine speed acceleration occurred (from an output of a crankshaft position or speed sensor). By comparing this to the known firing order and a known crank angle at which each fuel injector of each cylinder fires, the controller may determine which individual engine speed acceleration belongs to which specific cylinder (and the corresponding fuel injector). The controller may then determine which engine speed acceleration deviated from the other engine speed accelerations (or an average value of all of the engine speed accelerations) and then indicate degradation of the corresponding fuel injector (e.g., the fuel injector that injected fuel which corresponds to engine speed acceleration that varied the greatest amount or a threshold amount from the average).

At 514, the method includes determining if the identified engine speed acceleration resulting from injection via the indicated fuel injector is greater than an expected engine speed acceleration. In one example, the expected engine speed acceleration may be an average engine speed acceleration of all the engine cylinders. In another example, the expected engine speed acceleration may be determined from a look-up table with the commanded fuel injection amount (or pulse width) as the input and the expected engine speed acceleration as the output. If the engine speed acceleration of the indicated fuel injector is greater than the expected engine speed acceleration, the method continues to 516 to indicate injection error and/or an increase in a size of one or more nozzle holes of the injector (e.g., since this may mean too much fuel was injected via the identified fuel injector). In one example, the indication/action at 516 may include the controller sending an audible or visual indication to the vehicle operator that the fuel injector needs to be serviced or replaced. Alternatively, at 514, if the engine speed acceleration of the indicated fuel injector is not greater than (e.g., is less than) the expected engine speed acceleration, the method continues to 518 to indicate one or more of a clogged fuel injector, mechanical degradation of the fuel injector, and/or degradation of a solenoid of the fuel injector.

In this way, the technical effect of diagnosing a condition or indicating degradation of one or more fuel injectors of the engine is identifying a degraded or malfunctioning injector before more serious degradation of the engine or ceasing of functioning of the injector occurs. Further, by identifying which injector is experiencing a change in performance (as determined by correlating a change in response in an engine operating parameter following a pilot injection into one engine cylinder or a comparison of primary injections of fuel into all engine cylinders), the controller may take corrective action to compensate for the change in performance. For example, the controller may adjust fuel injection to account for a changing effective pulse width of one or more of the injectors. By identifying which injector is degraded, only the degraded injector may be serviced or replaced (and not every single fuel injector). This may reduce repair and/or replacement costs. Further, if fuel injectors continue to be functional past their specified lifetime, they may continue to be used, rather than automatically replaced at a pre-defined usage period (such as A months or B mega-watt hours), thereby saving additional part costs.

As one embodiment, a method for an engine comprises injecting a first pulse of fuel as a first pilot injection into a first subset of cylinders of a plurality of engine cylinders, where the first pilot injection precedes a primary injection of fuel into the first subset of cylinders by a duration; correlating a first response in an engine operating parameter to the first pilot injection; and adjusting the primary injection of fuel into the first subset of cylinders based on the first response. In one example, the first subset of cylinders includes a single cylinder, injecting the first pulse of fuel includes injecting the first pulse of fuel as the first pilot injection into only the single cylinder via a first fuel injector, and the method further comprises diagnosing a condition of the first fuel injector based on a change in the first response over a number of first pilot injections. The method may further comprise estimating an effective pulse width of the first fuel injector based on the first response for the number of first pilot injections and diagnosing the condition of the first fuel injector based on a change in the estimated effective pulse width over the number of first pilot injections. In one example, diagnosing the condition of the first fuel injector includes indicating an increase in a size of one or more nozzle fuel spray holes of the first fuel injector in response to the estimated effective pilot pulse width decreasing over the number of first pilot injections. In another example, diagnosing the condition of the first fuel injector includes indicating one or more of a decrease in response time of a solenoid of the first fuel injector or mechanical degradation of the first fuel injector in response to the estimated effective pulse width increasing over the number of first pilot injections. For example, the adjustment/correction may include the effective pilot pulse width being increased over the number of first pilot injections. Alternately, the response may include an increase in the rise-rate of the pilot pulse. In one example, the method may further comprise, at a different time during engine operation than injecting the first pulse of fuel, injecting a second pulse of fuel as a second pilot injection into a second subset of cylinders of the plurality of engine cylinders via one or more fuel injectors, where the second pilot injection precedes a primary injection of fuel into the second subset of cylinders by a pre-defined duration. The method may further comprise correlating a second response in the engine operating parameter to the second pilot injection, adjusting the primary injection of fuel into the second subset of cylinders based on the second response, and diagnosing the one or more fuel injectors based on a change in the second response over a number of second pilot injections. Further, in one example, the first pilot injection and the second pilot injection occur during different engine cycles where a primary injection of fuel is injected into each cylinder of the plurality of engine cylinders. In another example, the engine operating parameter is one of a knock level output by a knock sensor coupled to the first subset of cylinders, an engine speed output by an engine speed sensor coupled to a crankshaft of the engine, or an engine torque output measured by an engine torque sensor coupled to the crankshaft of the engine. The method may further comprise delivering the first pilot injection and the primary injection of fuel into the first subset of cylinders via one or more fuel injectors and adjusting the primary injection of fuel into the first subset of cylinders based on the first response may include determining an effective pulse width of the first pilot pulse of fuel based on the first response and adjusting a pulse width of the primary injection of fuel delivered by the one or more fuel injectors based on the determined effective pulse width. The method may further comprise injecting a second pulse of fuel as the primary injection of fuel into the first subset of cylinders, where the first pulse of fuel is smaller than the second pulse of fuel and where the first pulse of fuel and the second pulse of fuel are separated from one another by a pre-set spacing in time or crank angle. In another example, the method may further comprise injecting the first pulse of fuel as the first pilot injection into the first subset of cylinders in response to the engine operating at a selected notch level and at an engine speed within a threshold engine speed range. In still another example, injecting the first pulse of fuel as the first pilot injection occurs during a first engine cycle where a primary injection of fuel is injected into each cylinder of the plurality of engine cylinders and the first pilot injection of the first pulse of fuel is only injected into the first subset of cylinders, the method may further comprise, during a different, second engine cycle, not injecting the first pulse of fuel as the first pilot injection into the first subset of cylinders and injecting a second pulse of fuel as the primary injection into the first subset of cylinders, and where during the second engine cycle, the second pulse of fuel is larger than during the first engine cycle. In one example, the second pulse of fuel is larger than during the first engine cycle because 100% of the energy to power the engine and maintain engine speed and engine torque, is achieved via this single pulse versus a combination of the first pilot fuel pulse and the second primary fuel pulse.

As another embodiment, a method for an engine comprises injecting fuel into each cylinder of a plurality of cylinders of the engine over a single engine cycle via a plurality of fuel injectors, where each fuel injector of the plurality of fuel injectors is coupled to a different cylinder of the plurality of cylinders; determining individual engine speed accelerations resulting from the injection of fuel into each cylinder; and indicating degradation of one or more of the plurality of fuel injectors in response to a variation in the determined individual engine speed accelerations being greater than a threshold acceleration level. In one example, the method may further comprise indicating which fuel injector of the plurality of fuel injectors is degraded based on the individual engine speed accelerations and a known engine cylinder firing order of the engine. In another example, indicating degradation includes: indicating an increase in a size of one or more nozzle fuel spray holes of the indicated fuel injector in response to the individual engine speed acceleration resulting from the injection of fuel via the indicated fuel injector being greater than an expected engine speed acceleration for a non-degraded fuel injector; and indicating one or more of a decrease in response time of a solenoid of the indicated fuel injector or mechanical degradation of the indicated fuel injector in response to the individual engine speed acceleration resulting from the injection of fuel via the indicated fuel injector being less than the expected engine speed acceleration.

As yet another embodiment, a system for an engine comprises a plurality of engine cylinders including at least a first cylinder and a second cylinder; a first fuel injector coupled to the first cylinder; a second fuel injector coupled to the second cylinder; and a controller with computer readable instructions for: during a first engine cycle, injecting a primary pulse of fuel into the first cylinder via the first fuel injector and the second cylinder via the second fuel injector and injecting a pilot pulse of fuel, before the primary pulse, into only the first cylinder via the first fuel injector; correlating a first response in an engine operating parameter to injection of the pilot pulse of fuel into the first cylinder; and during a second engine cycle, following the first engine cycle, adjusting the primary pulse of fuel into the first cylinder based on the first response to the pilot pulse of fuel. In one example, the computer readable instructions further include instructions for: during a third engine cycle, injecting the primary pulse of fuel into the first cylinder via the first fuel injector and the second cylinder via the second fuel injector and injecting the pilot pulse of fuel, before the primary pulse, into only the second cylinder via the second fuel injector; correlating a second response in the engine operating parameter to injection of the pilot pulse of fuel; and during a fourth engine cycle, following the third engine cycle, adjusting the primary pulse of fuel into the second cylinder based on the second response to the pilot pulse of fuel. In another example, the system may further comprise a real-time engine torque output sensor coupled to a crankshaft of the engine, where the engine operating parameter is a torque signal output by the torque output sensor, and where the computer readable instructions further include instructions for diagnosing a condition of the first injector in response to a change in the torque output over a number of engine cycles when the pilot pulse of fuel is injected into the first cylinder via the first fuel injector. In yet another example, the system may further comprise a knock sensor coupled to the first cylinder, where the engine operating parameter is a knock signal output by the knock sensor, and where the computer readable instructions further include instructions for diagnosing a condition of the first injector in response to a change in the knock signal over a number of engine cycles when the pilot pulse of fuel is injected into the first cylinder via the first fuel injector.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for an engine, comprising:
   a plurality of engine cylinders including at least a first cylinder and a second cylinder;
   a first fuel injector coupled to the first cylinder;
   a second fuel injector coupled to the second cylinder; and a controller operatively coupled to the first and second fuel injectors and configured to:
    during a first engine cycle, control injection of a primary pulse of fuel into the first cylinder via the first fuel injector and the second cylinder via the second fuel injector and injection of a pilot pulse of fuel, before the primary pulse, into only the first cylinder via the first fuel injector;
    correlate a first response in an engine operating parameter to injection of the pilot pulse of fuel into the first cylinder; and
    during a second engine cycle, following the first engine cycle, adjust the primary pulse of fuel into the first cylinder based on the first response to the pilot pulse of fuel.

2. The system of claim 1, wherein the controller is further configured to:
    during a third engine cycle, control injection of the primary pulse of fuel into the first cylinder via the first fuel injector and the second cylinder via the second fuel injector and injection of the pilot pulse of fuel, before the primary pulse, into only the second cylinder via the second fuel injector;
    correlate a second response in the engine operating parameter to injection of the pilot pulse of fuel; and
    during a fourth engine cycle, following the third engine cycle, adjust the primary pulse of fuel into the second cylinder based on the second response to the pilot pulse of fuel.

3. The system of claim 1, further comprising a real-time engine torque output sensor coupled to a crankshaft of the engine, wherein the engine operating parameter is a torque signal output by the torque output sensor, and wherein the controller is configured to diagnose a condition of the first injector in response to a change in the torque output over a number of engine cycles when the pilot pulse of fuel is injected into the first cylinder via the first fuel injector.

4. The system of claim 1, further comprising a knock sensor coupled to the first cylinder, wherein the engine operating parameter is a knock signal output by the knock sensor, and wherein the controller is configured to diagnose a condition of the first injector in response to a change in the knock signal over a number of engine cycles when the pilot pulse of fuel is injected into the first cylinder via the first fuel injector.

5. The system of claim 1, wherein the first response to the injection of the pilot pulse occurs before the primary injection into the first cylinder.

6. The system of claim 1, wherein the controller is further configured to, during a third engine cycle, control an injection of a pilot pulse of fuel of the third engine cycle, before a primary pulse of the third engine cycle, into only the first cylinder via the first fuel injector.

7. The system of claim 6, wherein the controller is further configured to correlate a response of the third engine cycle in an engine operating parameter to the injection of the pilot pulse of the third engine cycle fuel; and
    determine a difference between the first response to the injection of the pilot pulse of fuel and the response of the third engine cycle.

8. The system of claim 7, wherein the controller is further configured to correlate a response of a further subsequent engine cycle in an engine operating parameter to an injection of a pilot pulse of the further subsequent engine cycle into the first cylinder; and
    compare the first response to the injection of the pilot pulse of fuel, the response of the third engine cycle and the further subsequent engine cycle.

9. The system of claim 8, wherein the controller is further configured to adjust injections of primary pulses into the first cylinder based on the comparison of the first response to the injection of the pilot pulse of fuel, the response of the third engine cycle and the further subsequent engine cycle.

10. The system of claim 8, wherein the controller is further configured to indicate degradation when the comparison determines that responses to pilot injections deviate farther from a threshold with time.

* * * * *